United States Patent [19]

Underwood

[11] Patent Number: 4,501,338
[45] Date of Patent: Feb. 26, 1985

[54] GREASE PUMP FOR SEALED BEARING ROTARY CONE ROCK BITS

[75] Inventor: Lance D. Underwood, Lafayette, La.

[73] Assignee: Smith International, Inc., Newport Beach, Calif.

[21] Appl. No.: 520,964

[22] Filed: Aug. 8, 1983

[51] Int. Cl.³ .............................................. E21B 10/24
[52] U.S. Cl. ....................................... 175/229; 384/93
[58] Field of Search ............................ 175/227-229, 175/371, 372; 384/93; 184/31; 418/175, 177

[56] References Cited

U.S. PATENT DOCUMENTS

| | | | |
|---|---|---|---|
| 1,487,319 | 3/1924 | Duda | 175/228 |
| 2,174,102 | 9/1939 | Catland | 175/228 |
| 3,244,459 | 4/1966 | Ortloff | 175/229 |
| 3,841,422 | 10/1974 | Crow | 175/229 |
| 4,181,185 | 1/1980 | Keller et al. | 175/229 |
| 4,183,416 | 1/1980 | Walters | 175/229 |

FOREIGN PATENT DOCUMENTS

| | | | |
|---|---|---|---|
| 453940 | 1/1949 | Canada | 418/175 |
| 301422 | 7/1971 | U.S.S.R. | 175/227 |
| 825831 | 4/1981 | U.S.S.R. | 175/371 |
| 825832 | 4/1981 | U.S.S.R. | 175/371 |

Primary Examiner—James A. Leppink
Assistant Examiner—Hoang C. Dang
Attorney, Agent, or Firm—Robert G. Upton

[57] ABSTRACT

A positive displacement grease pump apparatus is disclosed to circulate a lubricating grease from a grease reservoir system, formed within a body of a sealed bearing rotary cone rock bit. The relatively viscous grease is positively circulated to and from the reservoir through bearings defined between a rotary cone and its respective journal bearing extending from the rock bit body.

8 Claims, 8 Drawing Figures

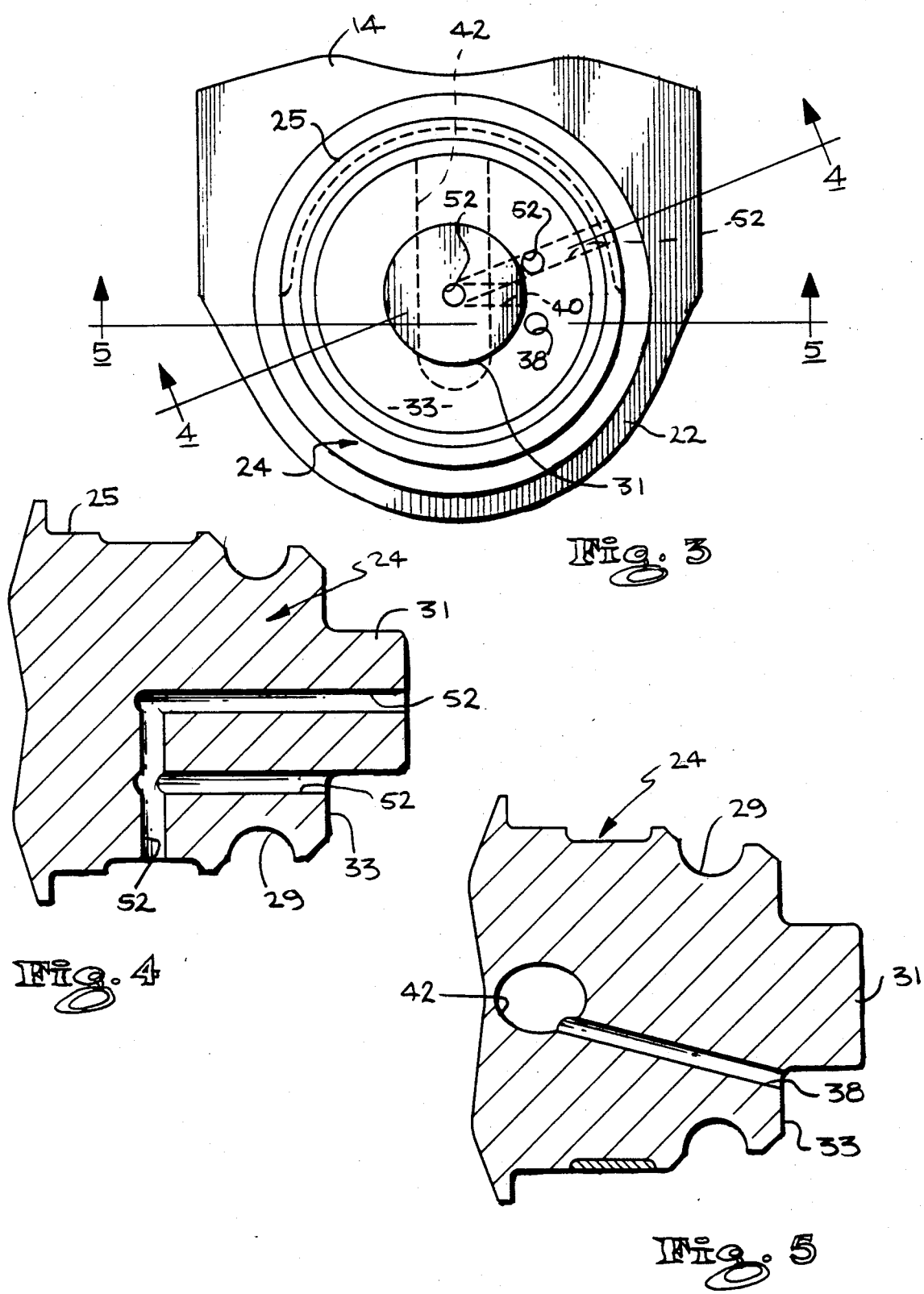

GREASE PUMP FOR SEALED BEARING ROTARY CONE ROCK BITS

BACKGROUND OF THE INVENTION

1. Field of the Invention

This invention relates to sealed bearing rock bits.

More particularly, this invention relates to sealed bearing rock bits with a means to circulate lubricating grease from a rock bit reservoir system to bearings defined between one or more rotary cones and their respective journals.

2. Description of the Prior Art

Down through the years in the drilling industry there have been various methods incorporated to lubricate rock bits as they operate in a borehole.

The following prior art patents all relate to a means to lubricate a rotary cone rock bit. This prior art includes the following U.S. Patent Nos.: 1,487,319 (O. Duda/3-18-24); 2,174,102 (A. C. Catland/9-26-39); 3,244,459 (J. E. Ortloff/4-5-66); 3,251,634 (D. W. Dareing/5-17-66); 3,463,270 (H. P. O. Lundstrom et al/8-26-69); 3,841,422 (M. L. Crow/10-15-74); 3,844,364 (M. L. Crow/10-29-74); 4,167,219 (R. W. McQueen/9-11-79), 4,181,185 (W. S. Keller et al/1-1-80); and 4,183,416 (D. F. Walters/1-15-80).

U.S. Pat. No. 1,487,319 describes a system to apply pressure to a lubricating reservoir section above a rock bit. The lubricant circulates through the bearing surfaces of the rock bit into the borehole as the rock bit works in the hole. An axially aligned roller, mounted in a sub section above the bit, contacts the borehole surface. The roller includes an eccentric vane type pump which is driven by the roller as it contacts the wall of the borehole during operation of the rock bit. Each revolution of the roller drives a vane, riding in an eccentric track, which supplies fluid under pressure to one side of a piston near the top of the oil reservoir in the sub pipe section mounted to the rock bit. Pressure on top of the piston drives lubricant within the reservoir above the rock bit to force lubricating fluids through the bearing surfaces of the rotary cone rock bit attached to the sub. The foregoing pressurizing system is housed in a separate sub section that is attached to a rock bit and is not integral with the rotary cone bit nor is the rock bit a sealed bearing rock bit, the lubricant being free to flow through the bearing surfaces and out of the bit as it works in a borehole.

U.S. Pat. No. 2,174,102 describes a sealed bearing rock bit with internal lubricating fluid circulation means within the bit. A cam surface is provided within the bearing surfaces of a rotary cone mounted to a journal of a rock bit. A check valve means is retained radially within the journal bearing of the rotary cone. Rotation of the cone drives the stem of a check valve up a ramp in the cone bearing surface to allow lubricant, under pressure from a reservoir centrally positioned in the journal, to pass to the bearing surfaces.

Journal bearings for rock bits are subjected to severe shock and bending loads under downhole conditions in a drilling operation, hence, the rock bits must necessarily be extremely rugged. This particular patent illustrates a relatively large lubricant chamber centrally positioned within the journal bearing to act as a lubricant reservoir. The chamber communicates with radially directed passages to move lubricant from the central pressurized chamber to the bearing surfaces. It is generally undesirable to interrupt the integrity of a journal bearing for a rock bit by providing large passages either axially or radially in the journal. Catastrophic journal failures, due to heavy shock and stresses, are more likely to occur in this type of design.

U.S. Pat. No. 3,244,459 describes yet another rock bit with an internal lubrication system. This patent describes a rather large axially aligned hole through the center of a journal bearing with a piston fitted within the bore in the journal, backed up by a spring. The piston is driven by a cam connected to the cone that rides against an end of the piston. Rotation of the cone drives the piston axially back and forth, thereby pumping lubricant from a reservoir in the leg of the rock bit to the bearing surfaces. Point contact of the cam surface with the piston pump causes relatively high unit loading which would be detrimental to the smooth, relatively drag-free operation of the rock bit.

This patent is somewhat similar to the '102 patent described above in that it has a very large axially aligned hole through the center of the journal, thereby weakening the journal by subjecting it to fracture type failures under downhole working conditions.

U.S. Pat. No. 4,183,416 describes a sealed bearing rotary cone rock bit having a rotating cone with an axially aligned, inwardly extending spiral screw that interfits within an axially aligned chamber in the journal bearing of the rotary cone. The rotary cone, as it rotates on a borehole bottom, tends to influence migration of lubricant from a reservoir through the bearings and back to the reservoir in a lubricant pumping circulation system. Again, this bit has a relatively large hole bored axially through the center of the journal bearing, thus providing a fracture path under load conditions.

This patent however is not a positive displacement pump and its effectiveness to move lubricant is doubtful. It is generally known that grease for lubrication of rock bits is highly viscous and does not "flow" as does a less viscous oil.

U.S. Pat. Nos. 4,181,185 and 4,183,416 similarly are not positive displacement type pumps and serve only to influence grease migration. The basic principle is fundamentally different from the present invention where highly viscous grease is forced from a grease reservoir to the bearing surfaces and back to the reservoir.

SUMMARY OF THE INVENTION

It is an object of this invention to provide a sealed bearing rotary cone rock bit with a means to circulate relatively viscous lubricating grease from a rock bit reservoir to bearings defined between one or more rotary cones and their respective journals.

It is another object of this invention to provide a means to circulate lubricant through bearing surfaces of a rock bit without adversely affecting the integrity of the journal connected to a leg of the bit body.

It is still another object of this invention to provide a means to circulate lubricant within a sealed bearing rotary cone rock bit by providing a positive displacement pump within the journal of the rock bit to positively move a relatively viscous grease from a reservoir system through the bearing surfaces and back to the reservoir.

A rotary cone rock bit is disclosed which includes a bit body, a rotatable cutter, bearing means including a journal extending from said bit body for promoting rotation of the cutter mounted on the journal. The journal further comprises a first bearing portion with a first diameter and a second bearing portion with a second diameter, the second diameter being smaller than the first diameter. A radially disposed journal bearing thrust surface is formed between the first portion and the second portion. A seal is placed between the rotatable cutter and the body. The bit further includes a positive displacement lubricant circulation system consisting of a lubricant reservoir formed by the bit body.

Passage means are additionally formed in the bit body for channeling lubricant from the lubricant reservoir to the bearing means and from the bearing means to the lubricant reservoir.

A vane guide port is also formed in the second bearing portion of the journal. The vane guide port is oriented substantially transverse to an axis of the journal. The vane guide port supports a vane with first and second ends within the port. The first end of the vane is biased by resilient means to ensure the second end of the vane contacts a vane reciprocating means, operable by the cutter, to move the vane within the port. Rotation of the cutter cone circulates lubricant through the passage means from the reservoir to the bearing means and back to the reservoir during operation of the bit within a borehole.

A vane reciprocating means is associated with the port in the spindle end of the journal. A spring-loaded vane, slidably positioned within the vane port, is driven by a cam surface thrust bearing means eccentrically positioned within the rotary cutter mounted on the journal. The rotating cutter drives the cam means which in turn moves the vane within the vane port in a reciprocating fashion to form a seal between the inlet lube passage and the outlet lube passage.

An advantage of the foregoing lubricant pump system is the small size of the vane and its guide port, as well as the lubricant passages formed in the journal. Thus the structural integrity of the journal, cantilevered from a leg of the bit body, is maintained. As heretofore stated, the size of the passages within the journal is important due to the tremendous load to which the journal is subjected during operation of the rotary cone rock bit within a borehole. It is not uncommon for rock bits to be subjected to drillstring loads from ten to forty thousand pounds while drilling in a borehole.

Yet another advantage of the present invention is the positive way in which the viscous lubricant is circulated through the bit.

The above noted objects and advantages of the present invention will be more fully understood upon a study of the following description in conjunction with the detailed drawings.

BRIEF DESCRIPTION OF THE DRAWINGS

FIG. 3 is a view taken through 3—3 of FIG. 2 illustrating an end view of the journal and the lube circulating passage formed therein;

FIG. 4 is a cross section taken through 4—4 of FIG. 3 showing intersecting lube passages;

FIG. 5 is a cross section taken through 5—5 of FIG. 3 illustrating the lube intake passage that communicates with the lube reservoir system;

DESCRIPTION OF THE PREFERRED EMBODIMENTS AND BEST MODE FOR CARRYING OUT THE INVENTION

Figure 1:
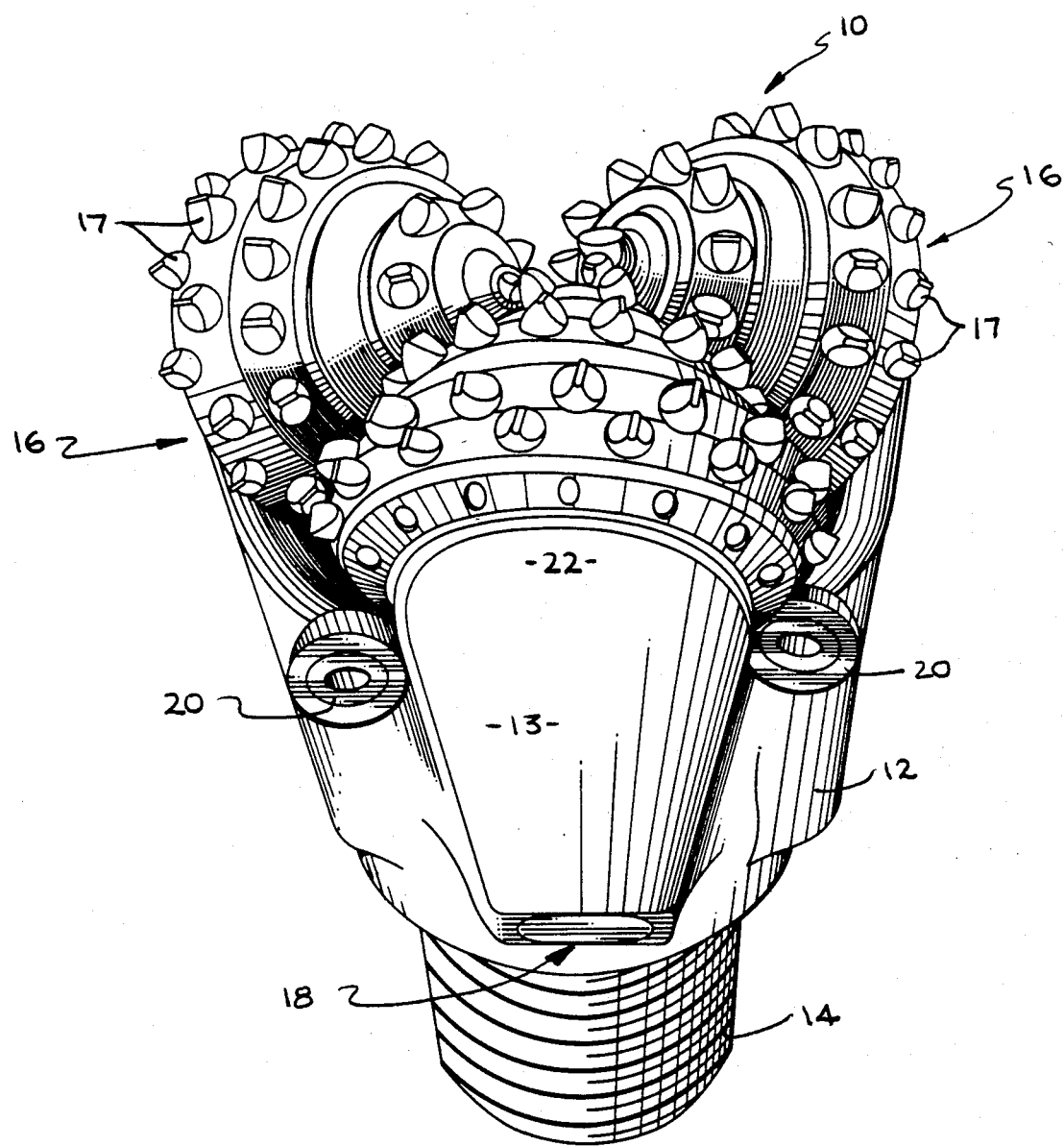
FIG. 1 is a perspective view of a typical sealed bearing rotary cone rock bit.

Referring now to FIG. 1, a sealed bearing rotary cone rock bit, generally designated as 10, consists of rock bit body 12 forming an upper pin end 14 and a cutter end of rotary cones 16, supported by legs 13 that extend from body 12. The threaded pin end 14 of rock bit 10 is adapted to be connected to a drillstring (not shown). Contained within bit body 12 is a grease reservoir system, generally designated as 18. Lubricant passages are provided from the reservoir 18 to rotary cone bearing surfaces formed between a journal 24 and the cone 16. Each of the legs 13 terminate in a shirttail portion 22. The roller cone 16 typically has a multiplicity of tungsten carbide inserts 17 interference fitted in insert sockets formed within each of the cones 16. Drilling fluid is directed within the hollow pin end 14 of the bit 10 to the interior of the bit body 12 and out through nozzles 20 to cool the rock bit and to clean the detritus from the bottom of the borehole as the bit works in the earth formation.

Figure 2:
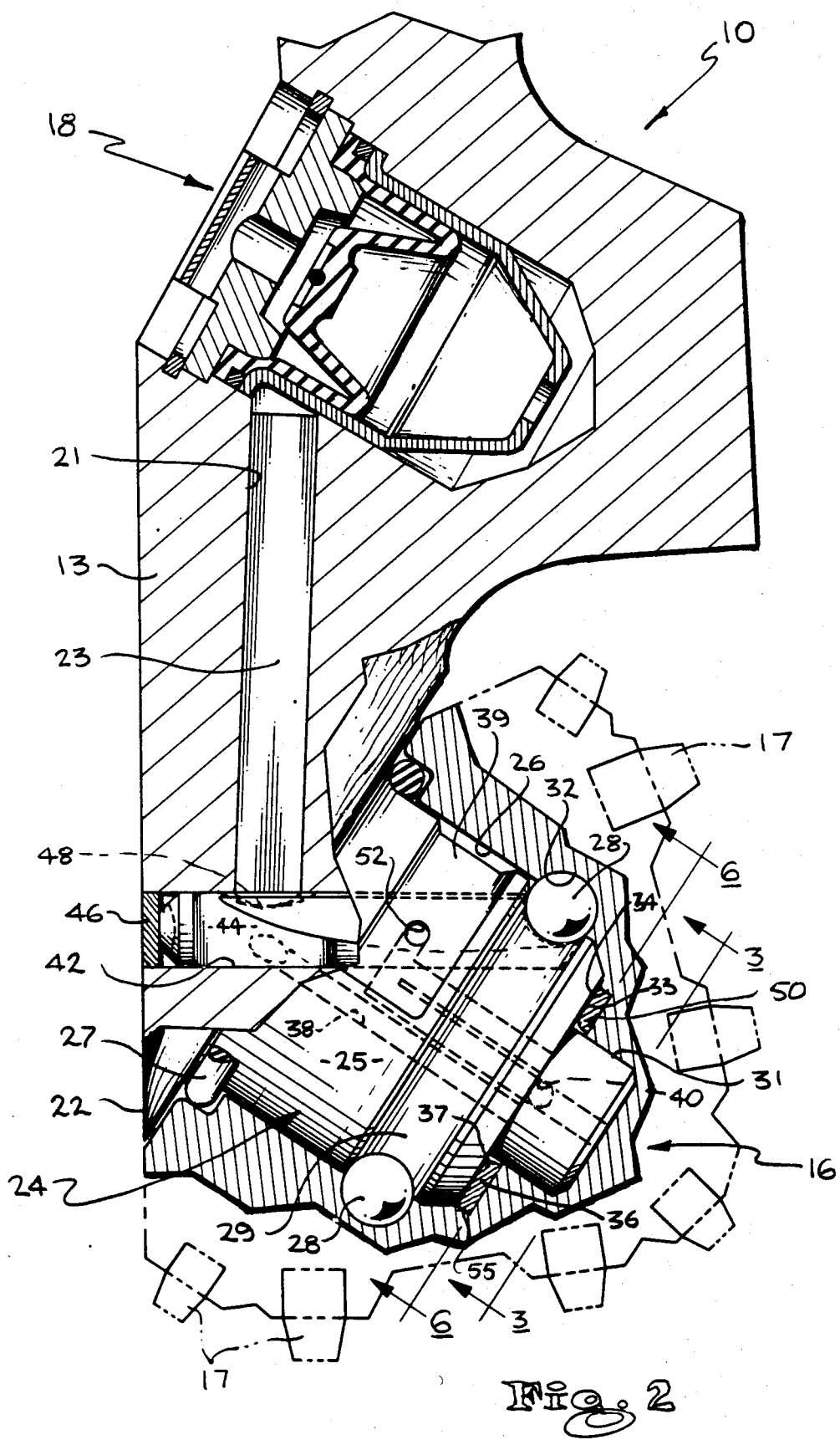
FIG. 2 is a partially cut-away section of a leg of the rock bit of FIG. 1, illustrating the lubricating reservoir system and how it is associated with a means to pump the lubricant from the reservoir to the bearing surfaces.

Turning now to FIG. 2, the partially broken away cross section of a leg 13 of the bit illustrates the grease reservoir system 18 in detail. Lubricant contained within chamber 19 of the lube reservoir 18 is directed through lube passage 21 formed within the leg 13. The passage 21 terminates adjacent a ball plug hole 42. The ball plug hole 42 serves to admit a multiplicity of cone retention balls 28 to ball retention races 29 and 32, formed between journal 24 and cone 16. The balls 28 are passed through the ball plug hole 42, entering a track 29 formed in journal 24. The ball track 29 is indexed adjacent a ball track 32 formed in rotary cone 16. The ball track is filled with balls 28 and a ball plug 44 is subsequently inserted within the ball plug hole 42 to retain the balls within the track. The end of the plug 44 is welded within shirttail 22 of leg 13.

Journal 24 extends from leg 13 and forms bearing surface 25 which is the main bearing for the cone 16. The cone forms bearing surface 26 which provides a friction bearing for bearing 25. A smaller concentric spindle bearing 31 extends from the end 33 of journal 24 and is retained within a complementary bearing surface 35 formed within cone 16. A lubrication containing channel 39 is formed within bearing surface 25 of journal 24. The channel 39 is positioned on the unloaded side of the journal bearing to provide a source of lubricant for the bearing surfaces 25 and 26 within the cutter assembly. An O-ring 27 is positioned within a seal gland formed between the journal and the cone to seal the bearings during operation of the bit in a borehole.

A radially disposed surface 33 is spaced from a parallel radially disposed surface 50, formed in the cone 16. A washer 36 is disposed within the space provided between surface 33 on journal 24 and surface 50 on cone 16 that is confined within a track 34 formed within cone 16. An inner hole 37 is formed within the washer disc 36, the diameter of the hole being larger in diameter than the diameter of the spindle 31 of journal 24. The inner hole or cam surface 37 is concentric to the outer diameter of the washer 36. The recessed track 34 formed within cone 16, however, is eccentrically cut with respect to the centerline of the journal 24 so that, as the cone rotates on the journal, the washer 36 eccentrically travels around the spindle 31. A spring-loaded cam follower vane 41 is contained within a port 40 formed in the spindle 31. The vane is moved back and forth in the port as it tracks cam surface 37 of washer 36. The vane port combination is more clearly shown with respect to FIGS. 6 and 7.

With reference now to FIG. 3, the end of the journal is illustrated to show the orientation of the various lubricating ports formed within the journal 24. Vane port 40 is formed in the spindle 31 and is positioned substantially transverse to an axis of the journal. The port comes out about tangent to the radially disposed surface 33.

Referring now to FIGS. 2, 3, 4 and 5, lubricant enters channel 21 and is immediately divided by a channel divider 23 (FIG. 8) which splits the circular channel 21 in half. The divider 23 keys within a slot 48 in ball plug 44. The lubricant comes down one-half of the lube channel 21 and enters lubricant passage 38. Passage 38 intersects ball plug hole 42 and exits at radially disposed face 33. The lubricant is then circulated by the vane pump (FIGS. 6 and 7) from the lubricant supply port 38 to the lubricant passages 52 (FIGS. 3, 4 and 5) to the bearing surfaces and back into the ball plug hole 42. The lubricant then is pumped up the opposite side of the lubricant passage divider 23 to the reservoir 18.

Figure 6:
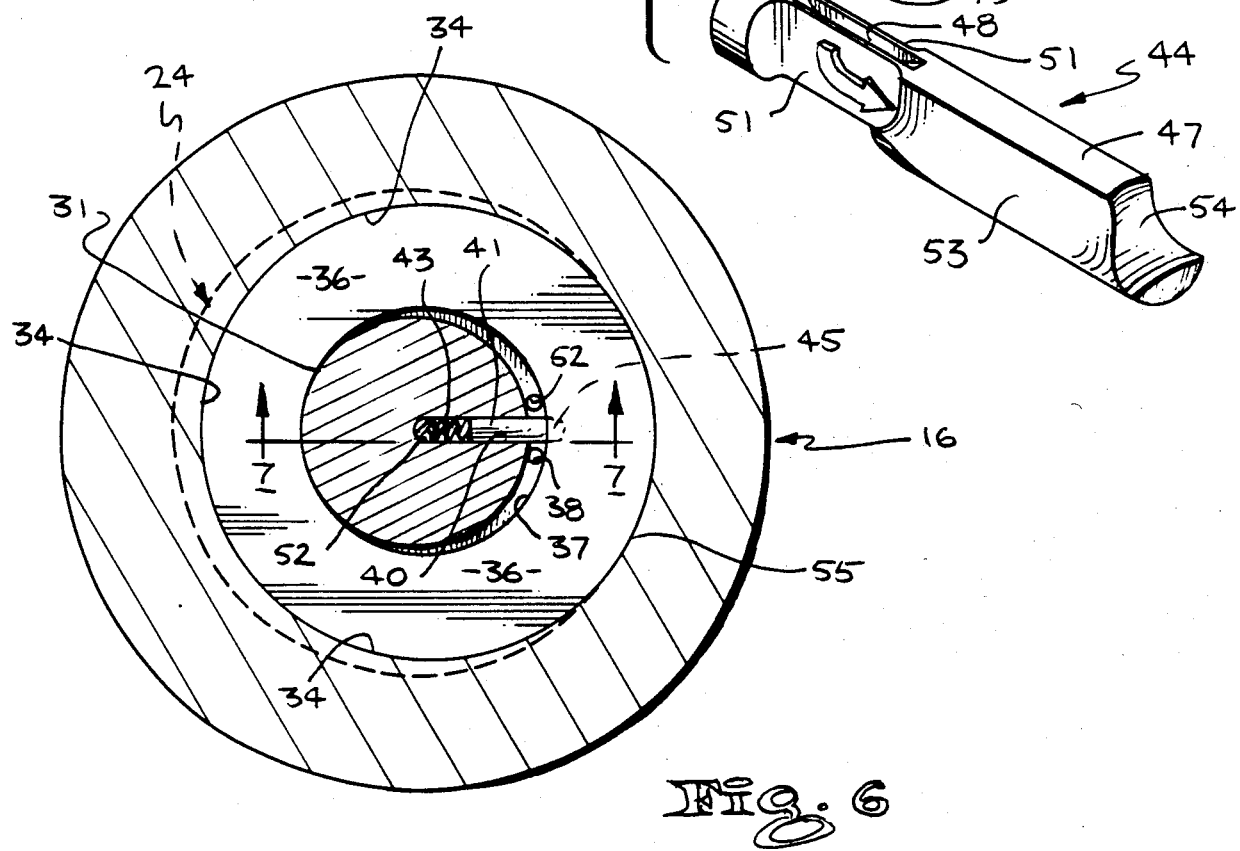
FIG. 6 is a partially cutaway cross section taken through 6—6 of FIG. 2, illustrating the thrust washer disc confined within its complementary eccentric recess formed in the cone, a spring actuated vane travels on a cam surface formed by the inside diameter of the disc.

With particular reference to FIG. 6, the washer 36 has an inner diameter cam surface 37 that is larger in diameter than the diameter of the spindle 31. The outer peripheral edge 55 of washer 36 is concentric to inner cam surface 37. The edge 55 is retained within an identical diameter recess 34 formed in the cone 16. The recess 34, however, is eccentric to the centerline of the journal so as to cause the washer 36 to eccentrically travel around the spindle 31 as the cone rotates on the journal 24. A vane 41 is contained within a vane guide port 40 formed in the spindle 31. The end 45 of the vane contacts the cam surface 37 of washer 36. The opposite end of the vane 41 is in contact with a spring 43. The spring acts to urge cam surface 45 of vane 41 against the cam surface 37 of washer 36.

During rock bit operation, as the cone rotates on the journal 24, the eccentrically travelling washer draws lubricant out of the lubricant passage 38. Continued rotation of the cone continually varies the space between the washer and the spindle, thus forcing lubricant into port 52 to the bearing surfaces and back to the reservoir in the closed loop lube system.

Figure 7:
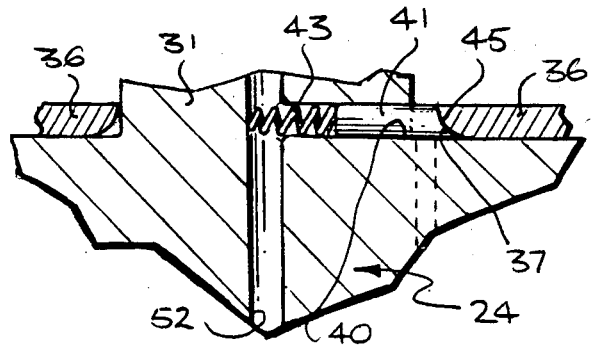
FIG. 7 is a partially broken away view taken through 7—7 of FIG. 6 showing the vane actuation means.

FIG. 7 illustrates in greater detail the relationship of the radially disposed vane guide port 40 in the spindle 31. The spring 43 urges the vane 41 that divides the intake port 38 from the exit ports 52 against the eccentrically travelling washer 36. The cam surface 45 formed at the opposite end of the vane 41 contacts a complementary surface 37 formed on the inner diameter of the washer 36.

Figure 8:
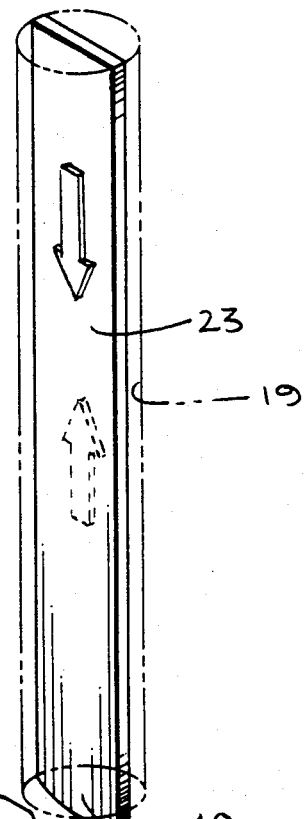
FIG. 8 is an exploded perspective view of the lubricant separating means to circulate viscous lubricant from the lube reservoir system, to the bearing surfaces and back to the reservoir.

With reference to FIG. 8, the ball plug 44 with the lubricant port divider 23 keyed therein (slot 48) is clearly illustrated. Phantomly illustrated lube port 21 in leg 13 is indicative of a means to utilize a single lube supply hole to provide inlet and outlet paths for a pumped lubricant. The positive displacement vane pump draws lubricant down one side of the divided port 21 into the pumping cavity formed between the eccentrically disposed washer 36 and the radially disposed space formed between the surface 33 of the journal 24 and surface 50 of the cone 16. The vane divider 41 serves as a barrier between the lubricant being drawn through ports or passages 38 and the lubricant being forced into lube passages 52 to the various bearing surfaces formed between the cone and the journal. The completed closed loop cycle brings lubricant from the bearing surfaces back into the ball plug hole 42 and up the opposite side of the lube divider 23 back into the chamber 19 of lube reservoir system 18.

It would be obvious to position the washer 36 concentrically within recess opening 34 in the cone 16 and provide an eccentrically positioned opening 37 with respect to outer diameter 55 of washer 36 (not shown).

It would also be obvious to eliminate washer 36 altogether and provide the eccentric path within the cone itself (not shown), however, the use of the washer facilitates assembly.

A preferred material for the washer 36 is beryllium copper although the washer may be fabricated from carburized steel, aluminum bronze, or a powdered metallurgy process.

It would be additionally obvious to provide one-way acting check valves in inlet and outlet channels without departing from the scope of this invention. The highly viscous nature of rock bit lubricant generally precludes the use of one-way check valves in the closed loop system. It has been found in the preferred embodiment of the invention heretofore described that check valves were unnecessary and their removal eliminated a potential problem relative to check valves.

It will of course be realized that various modifications can be made in the design and operation of the present invention without departing from the spirit thereof. Thus, while the principal preferred construction and mode of operation of the invention have been explained in what is now considered to represent its best embodiments, which have been illustrated and described, it should be understood that within the scope of the appended claims, the invention may be practiced otherwise than as specifically illustrated and described.

I claim:

1. A rotary cone rock bit including a bit body, a rotatable cutter, bearing means including a journal extending from said bit body for promoting rotation of said cutter mounted on said journal, said journal further comprises a first portion with a first diameter, a second portion with a second diameter, said second diameter being smaller than said first diameter, a radially disposed journal bearing thrust surface being formed between said first portion and said second portion, and a seal between said rotatable cutter and said body, a positive displacement lubricant circulation system comprising:

a lubricant reservoir formed by said bit body, passage means formed by said bit body for channelling lubricant from said lubricant reservoir to said bearing means and from said bearing means to said lubricant reservoir, a vane guide port formed in said second portion of said journal, said vane guide port is oriented substantially transverse to an axis of said journal, said vane guide port supports a vane means within said port, said vane means forms first and second ends, said first end of said vane is biased by resilient means to ensure said second end of said vane contacts a vane reciprocating means operable by said cutter to move said vane within said port, said vane reciprocating means is an eccentric track formed in said cone, rotation of said cutter circulates lubricant through said passage means from said reservoir to said bearing means and back to said reservoir during operation of said bit within a borehole.

2. The invention as set forth in claim 1 wherein said resilient means is a spring.

3. The invention as set forth in claim 1 further comprising a separate radially disposed washer positioned between said journal and said cutter adjacent said radially disposed thrust surface formed between said first and second portion of said journal, an inner diametrical edge formed by said washer is larger than and eccentric to said second portion of said journal, said second end of said biased vane contacts said eccentric inner diametrical edge of said washer, as said cutter rotates on said journal said vane reciprocates within said vane guide port as said vane tracks said eccentric inner edge of said washer.

4. The invention as set forth in claim 3 wherein said washer forms outer and inner diameters that are concentric to one another, said inner diameter of said washer is larger in diameter than said second portion of said journal, said washer being radially disposed within an eccentric recess formed within said cutter, rotation of said cutter causes said vane to reciprocate within said vane guide port to ciruclate lubricant within said bit.

5. The invention as set forth in claim 4 wherein said washer is fabricated from beryllium copper.

6. A sealed bearing rotary cone rock bit including a bit body, a rotatable cutter, bearing means including a journal extending from said bit body for promoting rotation of said cutter mounted on said journal, said journal further comprises a first portion with a first diameter, a second portion with a second diameter, said second diameter being smaller than said first diameter, a radially disposed journal bearing thrust surface being formed between said first portion and said second portion, and a seal between said rotatable cutter and said body, a positive displacement lubricant circulation system comprising:

a lubricant reservoir formed by said bit body, passage means formed by said bit body for channeling lubricant from said lubricant reservoir to said bearing means and from said bearing means to said lubricant reservoir, a vane guide port formed in said second portion of said journal, said vane guide port is radially disposed and substantially transverse to an axis of said journal, a vane means contained within said radially disposed port, said vane means forms first and second ends, said second end of said vane forms a cam follower surface thereby, a spring means positioned between said port and said first end of said vane to urge said vane radially outwardly, and a separate radially disposed washer positioned between said journal and said cutter adjacent said radially disposed thrust surface formed between said first and second portion of said journal, an inner diametrical edge formed by said washer is larger than and eccentric to said second portion of said journal, said inner edge further is shaped to conform to said cam surface formed on said second end of said vane, as said cutter rotates on said journal, said vane reciprocates within said vane guide port as said vane tracks said eccentric inner edge of said washer.

7. The invention as set forth in claim 6 wherein said washer forms outer and inner diameters that are concentric to one another, said inner diameter of said washer is larger in diameter than said second portion of said journal, said washer being radially disposed and contained within an eccentric recess formed within said cutter.

8. The invention as set forth in claim 7 wherein said washer is fabricated from beryllium copper.

* * * * *